United States Patent [19]

Lob

[11] 4,202,429
[45] May 13, 1980

[54] MOUNTING FOR A STATIONARY PAD OF A DISC BRAKE STRUCTURE

[75] Inventor: James P. Lob, Oconomowoc, Wis.

[73] Assignee: Deere & Company, Moline, Ill.

[21] Appl. No.: 914,563

[22] Filed: Jun. 12, 1978

[51] Int. Cl.² .............................................. F16D 65/02
[52] U.S. Cl. ................................... 188/71.1; 180/290;
  188/73.1; 188/73.6
[58] Field of Search ................... 188/71.1, 72.8, 73.1,
  188/73.6, 18 A, 250 B, 250 G; 74/608, 609, 611;
  180/5 R, 9.64, 72

[56] References Cited

U.S. PATENT DOCUMENTS

| | | | |
|---|---|---|---|
| 2,942,695 | 6/1960 | Butler | 188/73.6 |
| 3,110,364 | 11/1963 | Butler | 188/72.8 |
| 3,194,347 | 7/1965 | Hall | 188/18 A |
| 3,477,551 | 11/1969 | Beuchle et al. | 188/250 B |
| 3,684,045 | 8/1972 | Samuelson | 180/5 R |

FOREIGN PATENT DOCUMENTS

864407  4/1961  United Kingdom ..................... 188/73.6

OTHER PUBLICATIONS

*Johnson Skee–Horse Service Manual*, Outboard Marine Corp., Nov. 1970, pp. 10–15, 10–16.

Primary Examiner—Edward R. Kazenske

[57] ABSTRACT

A snowmobile drive train includes a chain case which supports one end of a drive shaft and includes a flange which surrounds a brake disc carried by the drive shaft. The chain case is provided with a three-sided pocket which extends radially inwardly toward the shaft from an entrance located in the periphery of the chain case. The pocket opens toward the brake disc and shaped similarly thereto and releasably retained therein is a brake puck carrier. A stationary brake puck is received in the radially inner end of the carrier and is supported for being withdrawn therewith through the entrance of the pocket. Fasteners for releasably retaining the carrier also connect a brake actuator to the chain case, the actuator including a movable brake puck for engaging the brake disc and moving the latter into engagement with the stationary puck.

6 Claims, 5 Drawing Figures

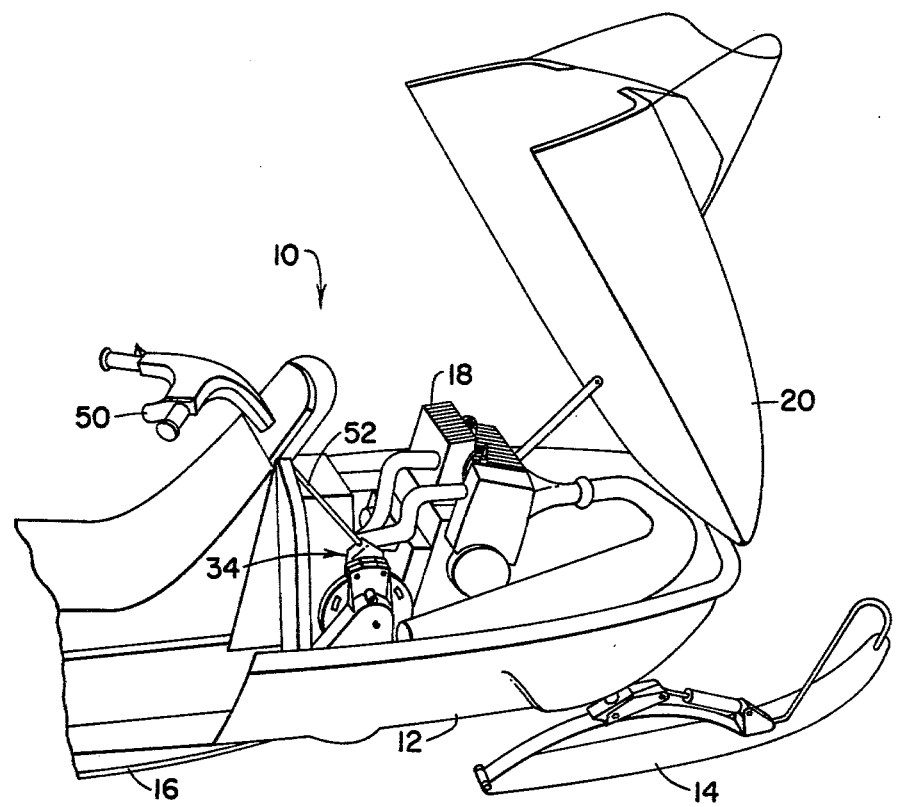
FIG. 1
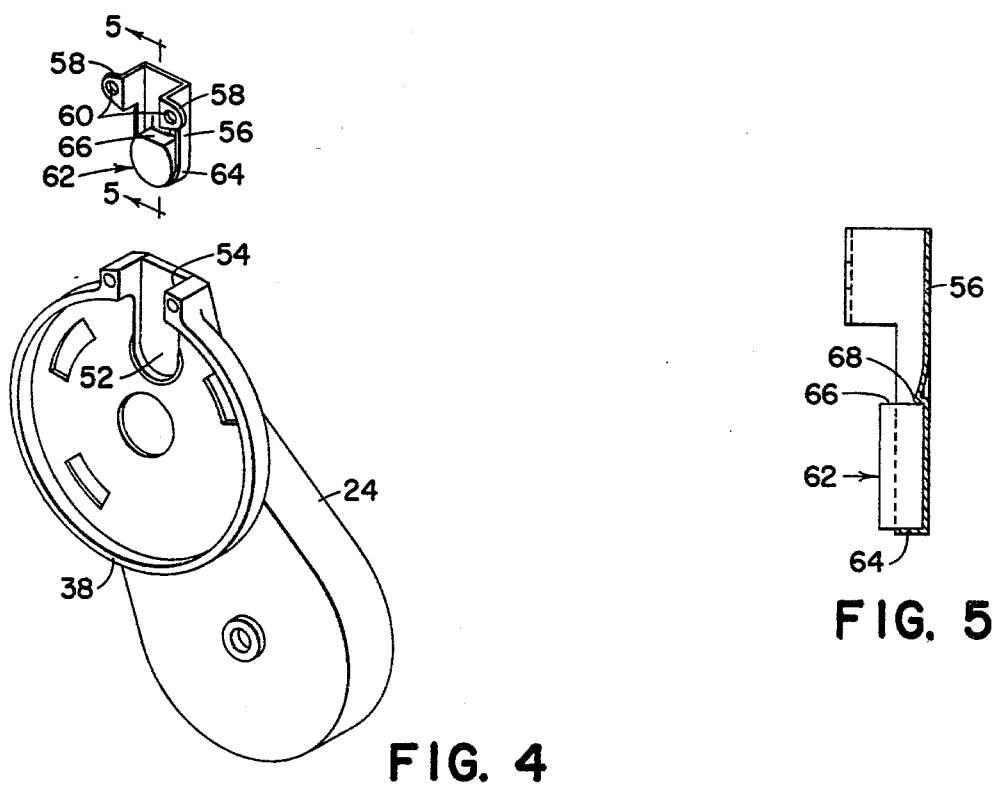
FIG. 4
FIG. 5

4,202,429

MOUNTING FOR A STATIONARY PAD OF A DISC BRAKE STRUCTURE

BACKGROUND OF THE INVENTION

The present invention relates to disc brakes and more particularly relates to a manner of mounting a disc brake puck.

Snowmobiles are often provided with a drive train including a chain case supporting one end of a secondary drive shaft. A brake disc is carried by the shaft adjacent a surface of the chain case defining an axially opening pocket in which is received a stationary disc brake puck for engagement by the disc upon actuation of an actuator including a brake puck which is movable toward the stationary puck for sandwiching the disc therebetween. This known construction suffers the disadvantage that in order to replace the stationary brake puck it is necessary to pull the drive shaft from the chain case so as to separate the brake disc a sufficient distance from the stationary puck to permit the latter to be axially removed from the pocket. A considerable amount of time (1½ hours for one known construction) is required for readying the drive shaft to be pulled as it is necessary to drain the oil from the chain case, disconnect drive input and output elements from the drive shaft and loosen the bearing supports from the shaft.

SUMMARY OF THE INVENTION

According to the present invention, there is provided a novel manner of mounting a stationary brake puck in a member disposed adjacent one face of a brake disc mounted on a drive shaft.

A broad object of the invention is to mount a disc brake pad adjacent a brake disc for quick, easy replacement.

A more specific object is to provide a puck carrier having the stationary puck supported therein, the carrier being releasably mounted in a position wherein one end thereof is accessible to an operator whereby the carrier may be released and withdrawn to a position wherein the puck is accessible.

Yet another object is to provide a puck carrier shaped complementary to and received within a pocket extending radially in a chain case toward a drive shaft projecting into the chain case, the pocket being located adjacent one face of a brake disc carried by the shaft.

Still another object is to provide a puck carrier as set forth in the immediately preceding object which is releasably secured to the chain case by the same mounting bolts that are used to releasably secure a housing, to the chain case, for supporting a shiftable brake puck adjacent the disc at a location on the opposite side of the latter from the stationary puck.

These and other objects will become apparent from a reading of the ensuring description together with the appended drawings.

BRIEF DESCRIPTION OF THE DRAWING

FIG. 1 is a perspective view of the right upper front portion of a snowmobile embodying the present invention.

FIG. 4 is an exploded perspective view of the left side of the chain case.

FIG. 5 is an enlarged sectional view of the puck carrier taken along the line 5—5 of FIG. 4.

DESCRIPTION OF THE PREFERRED EMBODIMENT

Figure 2:
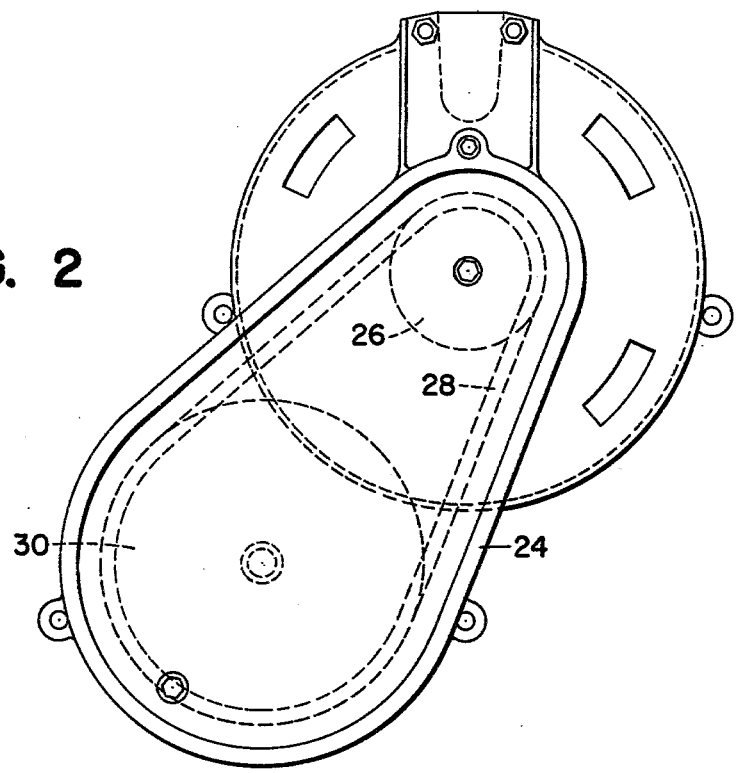
FIG. 2 is a right side elevational view of the chain case.

Referring now to FIG. 1, therein is shown a snowmobile 10 including a main frame 12 supported at its forward end on a pair of skiis 14 (only one visible) and at its rearward end by a suspended drive track 16. An engine 18 is mounted on the forward end of the frame 12 so as to be in a compartment formed by the frame 12 and a hood 20 when the latter is pivoted downwardly from an open position, as shown, to a closed position.

Not visible in FIG. 1 is a portion of the drive train of the snowmobile which includes an output shaft which projects from the left side of the engine 18 and has a variable speed primary pulley connected thereto and coupled, through means of a drive belt, with a variable speed secondary pulley connected to the left end of a secondary or counter-shaft 22 (FIG. 3) having its right end projecting into a chain case 24 where it is supported by a bearing carried by the latter. A sprocket 26 is mounted on the shaft 22 within the chain case 24 and is coupled, through means of a drive chain 28, to a sprocket 30 mounted on the right end of a track drive shaft 32.

Figure 3:
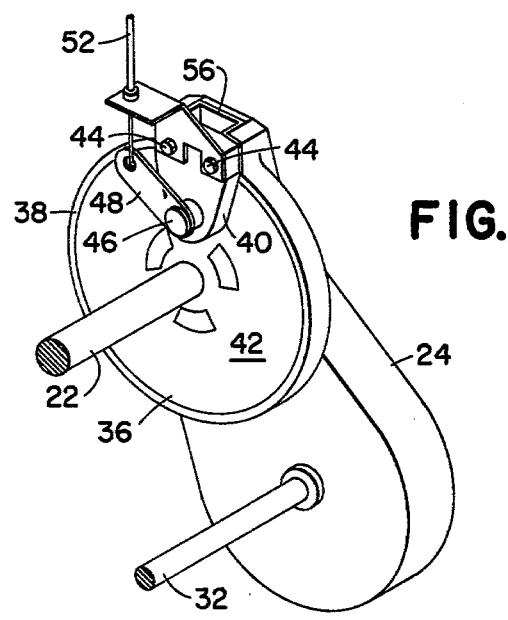
FIG. 3 is a perspective view of the left side of the chain case showing its relationship with the drive shaft, brake disc and brake actuator.

As can best be seen in FIGS. 1, 3 and 4, a disc brake structure 34 is provided for selectively braking the drive train of the snowmobile and includes a brake disc 36 having a splined connection with the secondary shaft 22 for rotation therewith and limited axial shifting relative thereto at a location within the confines of an axially leftwardly extending annular flange 38 of the chain case 24. A shiftable brake puck (not shown) is located within a puck housing 40 extending alongside a left face 42 of the disc 36 and releasably secured to an upper portion of the chain case 24 by a pair of mounting bolts 44. Projecting into the housing 40 for selectively shifting the shiftable brake puck into engagement with the left face 42 of the disc 36 is a puck-shifting screw 46 having a lever 48 fixed thereto and connected to an actuator lever 50 (FIG. 1), by means of a cable 52 which acts, when the lever 50 is depressed, to lift the lever 50 to cause the screw 46 to be advanced toward the disc 36 to effect engagement of the puck with the disc.

Formed in the chain case 24 at a location at the opposite side of the disc 36 from the puck housing 40 and opening toward the disc 36 is a three-sided pocket or channel 52 which extends radially toward the shaft 22 from an entrance 54 of the pocket located in the upper periphery of the chain case. The pocket 52 is U-shaped as viewed facing the left side of the chain case 24 and shaped complementary to the pocket and received therein is a puck carrier 56. The puck carrier 56 is preferably stamped from a piece of sheet metal and includes a pair of ears 58 which are provided with holes 60 in which the mounting bolts 44 are received such as to secure the ears 58 in place between the puck housing 40 and the chain case 24 and thus provide means for releasably securing the carrier 56 in place. A stationary brake puck 62 is received within the carrier 56 and rests upon a rounded bottom end portion of a leftwardly extending flange 64 of the carrier. The puck 62 is made with a flat upper surface 66 and an indentation is struck in the carrier 56 such as to create a tab 68 which extends above the puck surface 66 to prevent the puck from moving upwardly in the carrier.

The operation of the invention is as follows. Assuming that the snowmobile track 16 is being driven, the secondary shaft 22 will be rotating. Then, if it is desired to decrease the speed of the snowmobile by applying the brake thereof, the operator needs only to depress the actuator lever 50 toward the handle bar. This movement of the lever 50 will be transferred to the lever 48 and hence puck-shifting screw 46, via the cable 52. Such movement of the screw 46 advances it toward the disc 36 to engage the shiftable puck against the disc to shift the latter axially into engagement with the stationary brake puck 62. With the disc 36 sandwiched between the shiftable and stationary pucks effective braking is achieved.

Such braking action will gradually wear the brake pucks down to the point where they will need to be replaced. Such replacement is easily accomplished by merely removing the mounting bolts 44 to release the puck housing 40 to gain access to the shiftable puck. Since removal of the bolts 44 also releases the puck carrier 56, the carrier may be slid radially outwardly though the entrance 54 of the pocket 52 to expose the stationary puck 62 for replacement. Once the puck 62 is replaced, the carrier 56 is reinserted in the pocket 52 and the housing 40 is again bolted to the chain case 24. This procedure has been found to require approximately 15 minutes to accomplish with one snowmobile while the replacement of the brake pucks on the same snowmobile before being modified to include the present invention required a procedure which took approximately 1½ hours to accomplish.

I claim:

1. In a drive train including a chain case, a drive shaft extending into the chain case and having a brake disc mounted thereon for rotation therewith adjacent the chain case, a stationary brake puck located in a recessed pocket defined by the chain case and opening toward the brake disc for selected engagement therewith and a puck housing releasably secured for the chain case and carrying an actuating means and a shiftable brake puck located for selected engagement with the brake disc at a location aligned with and on the opposite side of the brake disc from that adapted for engagement by the stationary brake puck, the improvement residing in an improved mounting for the stationary brake puck comprising: said pocket having an entrance located in an outer peripheral location of the chain case; a puck carrier received in and removable from the pocket radially relative to said disc through said entrance and having an end located at said entrance; said stationary brake puck being received in an end of the carrier remote from said peripheral location; and fastening means releasably holding the puck carrier in said pocket and the puck housing in place on said case, whereby the carrier and the housing may be simultaneously released from said case by removal of said fastening means when replacement of the one or the other or both of the stationary and shiftable brake pucks is desired.

2. The drive train set forth in claim 1 wherein the puck carrier includes an abutment for retaining the puck in the end of the carrier.

3. The drive train set forth in claim 1 wherein the pocket is U-shaped as viewed toward a side thereof facing the brake disc and said puck carrier being shaped complementary to the pocket.

4. The drive train set forth in claim 1 wherein the puck carrier includes a flange and a tab extending toward the brake disc and spaced from each other and said stationary puck being received in the carrier between and in at least close proximity to the flange and tab.

5. The drive train defined in claim 4 wherein the puck carrier is formed of sheet metal and said tab comprises an indentation located at a side of the stationary puck which is remote from the flange so as to position the puck against the flange.

6. The drive train set forth in claim 1 wherein the puck carrier has a pair of oppositely projecting ears extending parallel to the brake disc and sandwiched between the chain case and the puck housing; and said fastening means including a pair of bolts respectively extending through the pair of ears.

* * * * *